United States Patent [19]

Ikeda et al.

[11] Patent Number: 5,741,541
[45] Date of Patent: Apr. 21, 1998

[54] METHOD FOR PRODUCING MAGNETO-OPTICAL RECORDING MEDIUM

[75] Inventors: Etsuro Ikeda; Masahiro Kikkawa; Takashi Kishi, all of Miyagi, Japan

[73] Assignee: Sony Corporation, Tokyo, Japan

[21] Appl. No.: 749,643

[22] Filed: Nov. 15, 1996

Related U.S. Application Data

[62] Division of Ser. No. 289,346, Aug. 11, 1994, Pat. No. 5,585,197, which is a continuation of Ser. No. 843,031, Feb. 28, 1992, abandoned.

[30] Foreign Application Priority Data

Feb. 28, 1991  [JP]  Japan ................................. 3-058014
Mar. 19, 1991  [JP]  Japan ................................. 3-059567

[51] Int. Cl.⁶ ............................. G11B 5/85; C23C 14/00
[52] U.S. Cl. .................... 427/130; 427/131; 204/192.15; 204/192.2; 204/192.22; 204/192.23; 204/192.27
[58] Field of Search ............................ 427/130, 131; 204/192.15, 192.2, 192.22, 192.23, 192.27

[56] References Cited

U.S. PATENT DOCUMENTS

| 4,565,734 | 1/1986 | Arai et al. ........................... 428/694 |
| 4,666,759 | 5/1987 | Okawa et al. ........................ 428/694 |
| 4,741,967 | 5/1988 | Yoshihara et al. ................... 428/469 |
| 5,019,462 | 5/1991 | Steininger .......................... 428/694 |

FOREIGN PATENT DOCUMENTS

| 0 279 581 A2 | 8/1988 | European Pat. Off. .......... G11B 5/72 |
| 0 307 554 A1 | 3/1989 | European Pat. Off. ........ H01F 41/18 |

OTHER PUBLICATIONS

Article by Kim et al from the Journal of Applied Physics, vol. 67, No. 9, May 1, 1990, pp. 5322 through 5324, "Influence on the Magnetic Properties by the Interface Reaction Between a TbCo Thin Film and a Si–Contained Protective Layer".

*Primary Examiner*—Stevan A. Resan
*Attorney, Agent, or Firm*—Hill & Simpson

[57] ABSTRACT

In a magneto-optical recording medium having a substrate, a recording layer having at least a rare earth-transition metal alloy film formed on the substrate, and a dielectric layer formed on the recording layer, a depth of penetration in the recording layer for an element derived from the dielectric layer is set to 70 Å or less from an interface between the recording layer and the dielectric layer in a depth-directional film structure analysis by an Auger electron spectroscopy. Accordingly, mixing of impurities into the recording layer can be suppressed to thereby lower the value of the required recording magnetic field.

8 Claims, 3 Drawing Sheets

METHOD FOR PRODUCING MAGNETO-OPTICAL RECORDING MEDIUM

This is a division of application Ser. No. 08/289,346 filed Aug. 11, 1994, now U.S. Pat. No. 5,585,797 which was a continuation application under the provisions of 37 CFR 1.62 of Ser. No. 07/843,031, filed Feb. 28, 1992, now abandoned.

BACKGROUND OF THE INVENTION

The present invention relates to a magneto-optical recording medium having a rare earth-transition metal alloy film as a recording layer, and, more particularly, to an improvement for lowering the required values for a recording magnetic field.

In recent years, a magneto-optical recording system has been considered as an overwritable high-density recording system. The magneto-optical recording system is such that a magnetic domain is written on a magnetic thin film to record information by using a thermal energy, which may be a semiconductor laser beam, and this information is read by utilizing a magneto-optical effect.

A typical recording material to be used in the magneto-optical recording system is known as a rare earth-transition metal alloy film (which will be hereinafter referred to as an "RE-TM film") formed by combining a rare earth element, such as Gd, Tb or Dy, and a transition metal, such as Fe or Co. For the magneto-optical recording medium having the RE-TM film as a recording layer, a recording medium having a four-layer structure consisting of a $Si_3N_4$ dielectric film, a TbFeCo magnetic film, a $Si_3N_4$ dielectric film and an Al reflecting film, has been proposed.

In manufacturing such a magneto-optical recording medium having the four-layer structure, as mentioned above, it is necessary to sequentially form the $Si_3N_4$ dielectric film, the TbFeCo magnetic film, the $Si_3N_4$ dielectric film and the Al reflecting film in this order on a substrate by sputtering or the like. In general, the $Si_3N_4$ dielectric film is formed by RF reactive sputtering in which an inert gas, such as Ar, and a reactive gas, such as $N_2$, as a sputtering gas are introduced into a film forming chamber.

However, when the magneto-optical recording medium is to be manufactured by the above-mentioned technique, there is a problem such that unless recording is carried out in an external magnetic field of 105 Oe or more, a satisfactory CN (carrier to noise) ratio cannot be obtained. This problem is a large obstacle in case of applying the magneto-optical recording medium in an overwritable magnetic field modulation system. Accordingly, the elimination of this problem is very important for realizing the magnetic field modulation system.

SUMMARY OF THE INVENTION

It is accordingly an object of the present invention to provide a magneto-optical recording medium which can suppress mixing of impurities into the TbFeCo magnetic film, which forms a recording layer, and which lowers the required values for a recording magnetic field.

To achieve the above object, the inventors, after a long study, have concluded that the above characteristics are largely influenced by a degree of penetration of a constituent element of a dielectric layer into the TbFeCo magnetic film.

The present invention has been accomplished on the basis of the above knowledge and, according to the present invention, there is provided in a magneto-optical recording medium having a substrate, a recording layer having at least a rare earth-transition metal alloy film formed on said substrate, and a dielectric layer formed on said recording layer with an improvement being that a depth (d) of penetration in the recording layer for an element derived from the dielectric layer is set to 70 Å or less (d≦70 Å) from an interface between the recording layer and the dielectric layer in a depth-directional film structure analysis by Auger electron spectroscopy.

In the magneto-optical recording medium according to the present invention, the RE-TM magnetic film is used as a recording layer, and at least a dielectric layer is formed on the RE-TM magnetic film. Specifically, the present invention may be applied to a magneto-optical recording medium having a four-layer structure consisting of a $Si_3N_4$ dielectric film, a TbFeCo magnetic film, a $Si_3N_4$ dielectric film and an Al reflecting film.

As the RE-TM magnetic film to be used in the present invention, all known magnetic materials, such as TbFeCo or GdFeCo, for a recording film of a conventional magneto-optical recording medium may be used. A film thickness of the RE-TM magnetic film is set to be in a range of about 100 Å to 1000 Å from the viewpoint of practical magneto-optical characteristics.

The recording layer may be constituted of the RE-TM magnetic film only, or may be constituted of the RE-TM magnetic film and a rare earth element layer, such as a Tb layer formed on the RE-TM magnetic film. The rare earth element layer has an influence upon recording and reproducing characteristics and enables recording and reproduction under a low magnetic field. However, if a film thickness of the rare earth element layer is too large, a noise tends to increase. Accordingly, it is preferable to set the film thickness of the rare earth element layer to a range of about 1 Å to 30 Å.

The dielectric layer is provided for the purposes of improvement in corrosion resistance and in an enhancement of a Kerr rotation angle and a Faraday rotation angle due to multiple reflections. The dielectric layer is formed of oxides, nitrides or oxynitrides of Si or the like or zinc sulfide (ZnS), for example. A film thickness of the dielectric layer is set in a range of about 100 Å to 2000 Å. In the case that either the dielectric layer is laminated on the recording layer (RE-TM film) or two of the dielectric layers are formed on both surfaces of the RE-TM magnetic film, the present invention is effective.

In the case that the dielectric film is laminated on the recording layer (RE-TM magnetic film), there occurs a phenomenon such that a constituent element of the dielectric film penetrates into the RE-TM magnetic film to some extent depending upon film forming conditions.

However, such an RE-TM magnetic film containing a constituent element of the dielectric film is not desired in the point of characteristics, and a proportion of such a penetration area in the RE-TM magnetic film largely influences a magnitude of an external magnetic field which will be required for recording.

In this circumstance, according to the present invention, a depth of penetration in the recording layer for an element derived from the dielectric layer is set to 70 Å or less from an interface between the recording layer and the dielectric layer.

The interface between the recording layer and the dielectric layer is decided by a depth-directional film structure analysis by Auger electron spectroscopy, and it is defined in the present invention as follows:

First, in a depth-direction Auger profile, an average peak lever of Si in case of a $Si_3N_4$ dielectric film or Zn in case of a ZnS dielectric film is obtained, and a position in the dielectric layer on the interface side with respect to the recording layer where a peak level of Si (or Zn) becomes ½ of this average peak level is obtained.

On the other hand, an average peak level of a rare earth element (e.g., Tb) of the RE-TM magnetic film is obtained, and a position in the recording layer on the interface side with respect to the dielectric layer where a peak level of the rare earth element becomes ½ of this average peak level.

Finally, a middle point between the above two positions is defined as the interface between the recording layer and the dielectric layer.

As to the area in the recording layer containing an element derived from the dielectric layer, this area corresponds to an area containing N in case of a $Si_3N_4$ dielectric film, and it is determined by observing a degree of penetration of N from the interface into the recording layer. Similarly, in case of a ZnS dielectric film, the area corresponds to an area containing S, and it is determined by observing a degree of penetration of S from the interface into the recording layer.

The setting of such a degree of penetration of the element derived from the dielectric layer into the RE-TM magnetic film to 70 Å or less may be realized by providing a blocking layer at the interface between the dielectric layer and the recording layer.

This blocking layer is a layer having a composition containing 3% or more of a dissimilar element (e.g., oxygen) not existing in the RE-TM magnetic film. For example, an Auger signal of oxygen to be observed between the dielectric layer and the recording layer and an Auger signal of Tb to be observed by an increase in yield due to oxidation correspond to the blocking layer.

A film thickness of the blocking layer may be obtained from a half-width of a signal having a peak at the interface between the dielectric layer and the recording layer in the depth-directional Auger profile. The blocking layer is sufficiently effective even in the condition where an atom of the dissimilar element is arranged. From this viewpoint, the film thickness of the blocking layer may be several Å or more. However, if the film thickness of the blocking layer is too large, the characteristics of the recording layer (RE-TM magnetic film) is resultantly damaged, and it is, therefore, preferable to set the film thickness to 100 Å or less in terms of the above-mentioned half-width.

The formation of the blocking layer at the interface between the dielectric layer and the recording layer may be realized by the following manner. That is, after forming the RE-TM magnetic film or forming a rare earth element layer on the RE-TM magnetic film, the RE-TM magnetic film (or the rare earth element layer) is allowed to stand for 30 minutes or more. Alternatively, the RE-TM magnetic film (or the rare earth element layer) is exposed to an atmosphere having a predetermined oxygen partial pressure or an atmosphere having a predetermined oxygen partial pressure and a predetermined moisture partial pressure, which is formed by steam, for a short time. The oxygen partial pressure may be set in a range of about $1\times10^{-10}$ to $1\times10^{-1}$ Torr, and the steam partial pressure may be set in a range of about $1\times10^{-10}$ to $1\times10^{-1}$ Torr. By setting the exposure time or other conditions within the above ranges, the blocking layer is formed.

In manufacturing the magneto-optical recording medium having the four-layer structure, as mentioned above, for example, the $Si_3N_4$ dielectric film of the third layer is formed by sputtering after forming the TbFeCo magnetic film of the second layer. Accordingly, the TbFeCo magnetic film is allowed to stand, however, for a very short time in contact with a plasma of Ar or $N_2$ dielectric film. Furthermore, the TbFeCo magnetic film is exposed to sputtered Si particles.

At this time, there occurs a phenomenon such that an active element (especially N of $N^+$), which is dissociated or ionized in the plasma, penetrates into the TbFeCo magnetic film to cause a deterioration in its characteristics.

However, according to the present invention, a depth of an area in the recording layer containing an element derived from the dielectric layer is set to 70 Å or less from the interface between the recording layer and the dielectric layer by a preferred technique of providing the blocking layer at the interface between the recording layer and the dielectric layer. Accordingly, the deterioration in the characteristics for the recording medium can be suppressed to enable lowering the value for the recording magnetic filed.

Since a degree of penetration of the element derived from the dielectric layer into the recording layer is set to 70 Å or less from the interface between the recording layer and the dielectric layer, the deterioration in recording characteristics are suppressed and a sensitivity of recording medium to an external magnetic filed is improved.

Other advantages and features of the invention will be readily apparent from the following description of the preferred embodiments, the drawings and claims.

DESCRIPTION OF THE PREFERRED EMBODIMENTS

The present invention will be more clearly understood with reference to the following examples.

EXAMPLE

In an Example, a magneto-optical recording medium having a four-layer structure consisting of a $Si_3N_4$ dielectric film, a TbFeCo magnetic film, a $Si_3N_4$ dielectric film and an Al reflecting film was prepared. In this four-layer structure, however, a Tb layer as a rare earth element layer was formed on the surface of the TbFeCo magnetic film. In addition, a glass 2p substrate was used as a substrate of the recording medium.

First, RF reactive sputtering was carried out by using an Si target in an Ar atmosphere containing 20% of $N^2$ gas under the gas pressure of $3\times10^{-3}$ Torr to form the first $Si_3N_4$ dielectric film.

Then, direct current simultaneous two-element sputtering was carried out by using a Tb target and a FeCo alloy target to form the TbFeCo magnetic film having a film thickness of 225 Å.

Then, direct current sputtering was carried out by using a Tb target to from the Tb layer having a film thickness of 5 Å.

After forming the Tb layer, it was exposed to an atmosphere having a moisture partial pressure of $1\times10^{-6}$ Torr and an oxygen partial pressure of $2\times10^{-4}$ Torr for one minute to form a blocking layer.

Then, RF reactive sputtering was carried out again by using an Si target to form the second $Si_3N_4$ dielectric film. Subsequently, direct current sputtering was carried out by using an Al target to form the Al reflecting film.

Finally, UV curing resin was applied to the Al reflecting film to form a protective film covering the Al reflecting film. Thus, a sample disk was prepared.

COMPARISION 1

Similar to the Example, a sample disk was prepared with the exception that the film thickness of the TbFeCo magnetic film was set to 230 Å and the second $Si_3N_4$ dielectric film was formed immediately after forming the TbFeCo magnetic film.

COMPARISION 2

Similar to the Example, a sample disk was prepared with the exception that the second $Si_3N_4$ dielectric film was formed immediately after forming the Tb layer.

Figure 1:
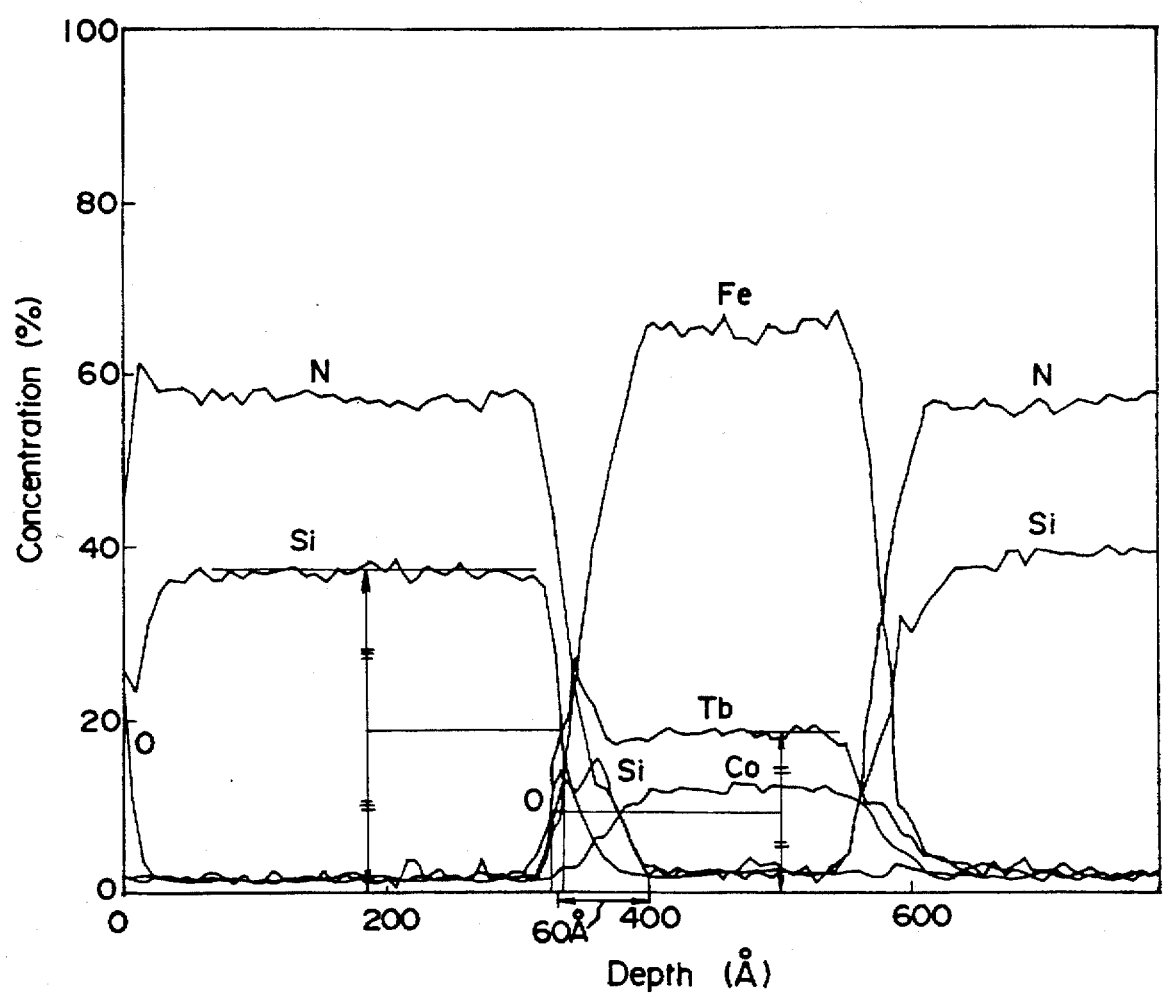
FIG. 1 is a graph illustrating an Auger profile for an Example according to the present invention having a blocking layer.
Figure 2:
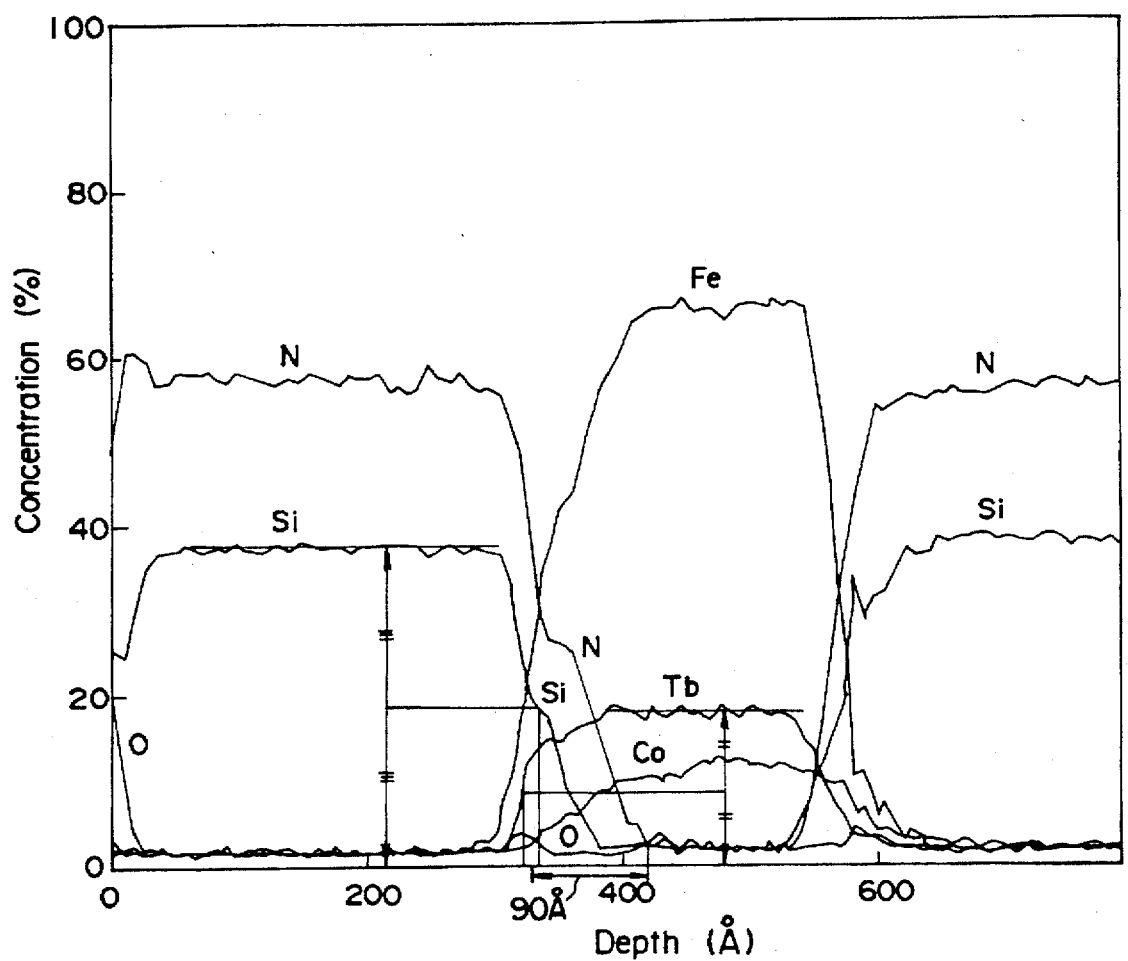
FIG. 2 is a graph illustrating an Auger profile for a Comparison 1.

Using the sample disks prepared above, a depth-directional film structure analysis by an Auger electron spectroscopy was carried out. There are shown the Auger profiles of the sample disks in FIGS. 1–3. FIG. 1 corresponds to the Example; FIG. 2 corresponds to the Comparison 1; and FIG. 3 corresponds to the Comparison 2. The conditions of the Auger electron spectroscopy were as follows:

| Ion Energy: | 1 kV |
|---|---|
| Emission Current: | 25 mA |
| Measurement Area: | $0.2 \times 0.2$ mm$^2$ |
| Sputter Rate: | 81 Å/min. |
| Acceleration Voltage: | 2 kV |
| Beam Current: | $5 \times 10^{-7}$ Å |
| Measurement Pressure: | $6.8 \times 10^{-8}$ Pa |
| Spot Radius: | 30 μm |

As apparent from comparison of these Auger profiles, it is observed in the Example that a peak of oxygen bonded to the Tb layer exists between the $Si_3N_4$ dielectric film and the TbFeCo magnetic film. This peak of oxygen corresponds to the blocking layer, and it is understood that the blocking layer having a film thickness of about 50 Å is formed.

Figure 3:
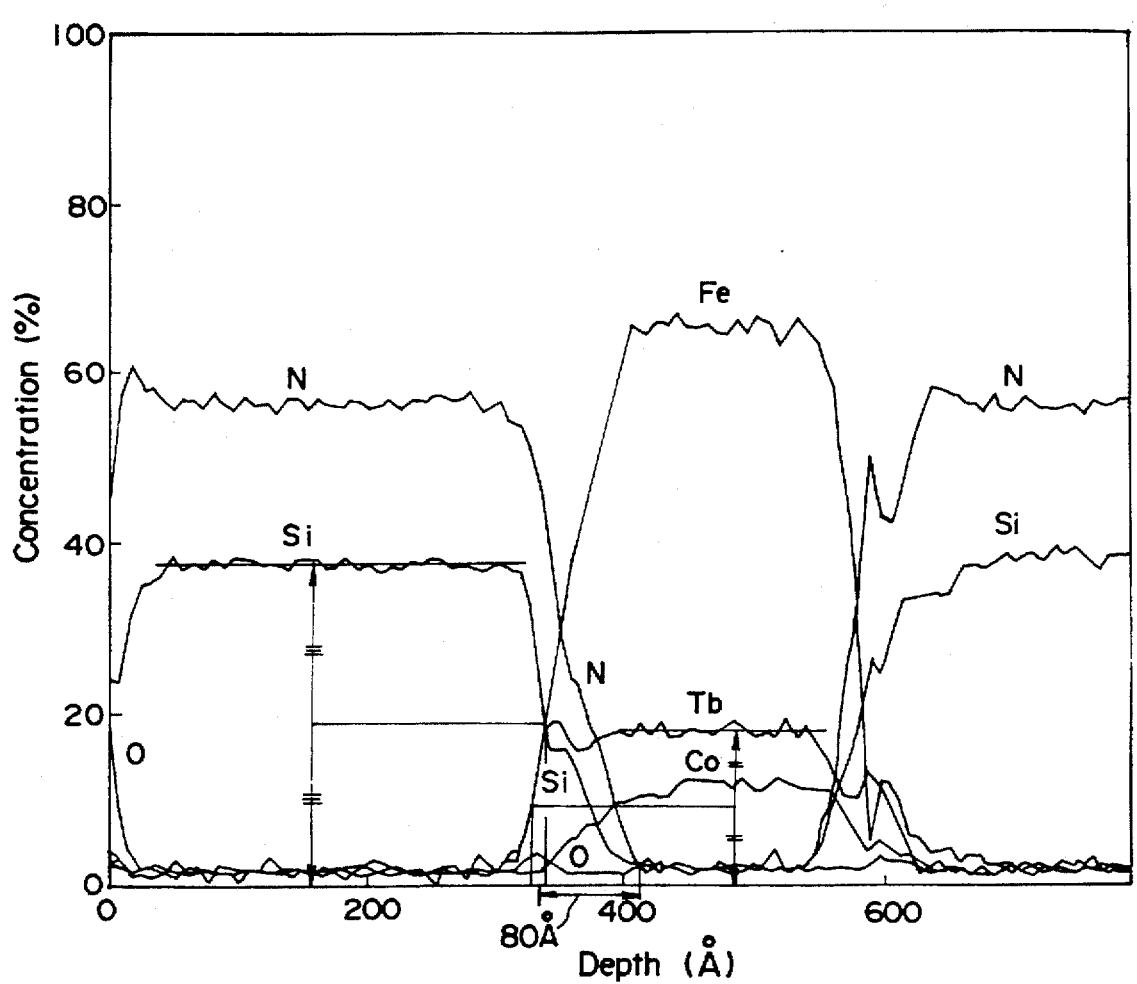
FIG. 3 is a graph illustrating an Auger profile for a Comparison 2.

It is also understood that a degree of nitrogen (N) penetrating into the RE-TM magnetic film is less in the Example than in the Comparison 1 and the Comparison 2. More specifically, as shown in FIGS. 1–3, the degree of penetration from the interface is 60 Å in the Example. To the contrary, the degree of penetration is about 90 Å in the Comparison 1. Yet in the Comparison 2 providing the Tb layer, the degree of penetration is about 80 Å.

Next, a recording and reproducing characteristic of these sample disks by a magnetic field modulation system was investigated. The recording and reproducing characteristic was measured under the conditions of 1.3 m/sec of medium linear velocity, 720 kHz of recording frequency, 4.5 mW of recording laser power and 0.6 mW of reproducing laser power. A spectral analysis for a whole frequency band of a reproduced waveform was carried out with a resolution band of 10 kHz to obtain a CN (carrier to noise) ratio in a recording external magnetic filed of ±70 Oe. The result is shown in Table 1. As apparent from Table 1, a magnetic filed sensitivity in the Example is improved.

TABLE 1

| | Magnetic Film Structure | $H_2O$ Partial Pressure (Torr) | $O_2$ Partial Pressure (Torr) | Retention Time (min.) | CN Ratio (dB) |
|---|---|---|---|---|---|
| Example | TbFeCo 225Å + Tb 5Å | $1 \times 10^{-6}$ | $2 \times 10^{-4}$ | 1 | 48.6 |
| Comparison 1 | TbFeCo 230Å | — | — | — | 42.6 |
| Comparison 2 | TbFeCo 225Å + Tb 5Å | — | — | — | 42.8 |

Although various minor modifications may be suggested by those versed in the art, it should be understood that we wish to embody within the scope of the patent granted hereon all such modifications as reasonably and properly come within the scope of our contribution to the art.

We claim:

1. A process for forming a magneto-optical recording medium having a substrate, a recording layer having at least a rare earth-transition metal alloy film formed on said substrate and a dielectric layer formed on said recording layer with a blocking layer interposed therebetween to limit a depth of penetration of an element of the dielectric layer into said recording layer, said process comprising forming the rare earth-transition metal alloy film on the substrate, forming the blocking layer containing a rare earth element oxide on said rare earth-transition metal alloy film and subsequently forming the dielectric layer upon the blocking layer.

2. A process according to claim 1, wherein the step of forming the rare earth-transition metal layer comprises a two-element sputtering being carried out by using a target of rare earth and a target of transition metal alloy.

3. A process according to claim 2, which further includes, prior to the step of forming the blocking layer, direct current sputtering a rare earth film on the rare earth-transition metal alloy film.

4. A process according to claim 3, which includes, subsequent to forming the dielectric film, forming an aluminum-reflecting film by sputtering.

5. A process for forming a magneto-optical recording medium comprising the steps of forming a first dielectric film on a substrate, then forming a recording layer of a rare earth-transition metal alloy magnetic film on the dielectric film, forming a rare earth metal film on said rare earth-transition metal alloy film, forming a blocking layer containing a rare earth element oxide on said rare earth film, then forming a second dielectric film on the blocking layer, said blocking layer limiting a depth of penetration of an element of the second dielectric film into the recording layer.

6. A process according to claim 5, wherein the step of forming the blocking layer comprises providing oxygen and moisture to oxidize a portion of the rare earth film to form said rare earth element oxide for the blocking layer.

7. A process for forming a magneto-optical recording medium comprising the steps of forming a first $Si_3N_4$ dielectric film on a substrate by reactive sputtering using an Si target in an argon atmosphere containing 20% nitrogen gas, then forming a rare earth-transition metal alloy magnetic film of TbFeCo on the first $Si_3N_4$ dielectric film by using a direct current, simultaneous two element sputtering carried out using a Tb target and an FeCo alloy target, then forming a rare-earth metal film of Tb by a direct current sputtering using the Tb target, forming a blocking layer on the Tb film by exposing the Tb film to an atmosphere having a moisture partial pressure of $1\times10^{-6}$ Torr and an oxygen partial pressure of $2\times10^{-4}$ Torr, and then forming a second dielectric film of $Si_3N_4$ by RF reactive sputtering using a Si target.

8. A process according to claim 7, which includes sputtering an aluminum-reflecting film on the second dielectric film.

* * * * *